United States Patent Office 3,271,389
Patented Sept. 6, 1966

3,271,389
PROCESS FOR THE ISOLATION OF CERTAIN BASIC PENICILLINS
David A. Johnson, Fayetteville, and Glenn A. Hardcastle, Jr., Syracuse, N.Y., assignors to Bristol-Myers Company, New York, N.Y., a corporation of Delaware
No Drawing. Filed June 8, 1964, Ser. No. 373,527
12 Claims. (Cl. 260—239.1)

This application is a continuation-in-part of our prior, copending application Serial No. 266,807 filed March 21, 1963, now Patent No. 3,157,640.

This invention relates to a novel and most efficient process for the isolation in high yield and high purity of α-aminophenyl-(or thienyl)-methyl penicillins and α-amino-substituted phenyl- (or substituted thienyl)-methylpenicillins from adducts thereof with certain arylsulfonic acids and certain aminodiarylsulfonic acids, and, more particularly, relates to the use in said process of aliphatic amines having the formula $$R-N-\underset{R^3}{\underset{|}{C}}-R^2$$ with H and $R^1$ on C wherein R is an aliphatic group having from 10 to 14 carbon atoms and $R^1$, $R^2$ and $R^3$ are each alkyl groups having in the aggregate a total of from 11 to 14 carbon atoms.

α-Aminobenzylpenicillin, α-amino-substituted-benzylpenicillins, α-aminothienylmethylpenicillin and α-amino-substituted-thienylmethylpenicillins are known in the technical literature, having been described, for example, in United States Patent No. 2,985,648 and Belgian Patent No. 631,631, the disclosures of which are incorporated herein by reference.

As used herein, the terms "an (or 'the') α-aminobenzylpenicillin" and "an (or 'the') α-aminoethienyl methylpenicillin" are intended to include α-amino-substituted-benzylpenicillins and α-amino-substituted thienylmethylpenicillins as well as α-aminobenzylpenicillin and α-aminothienylmethylpenicillin per se. Similarly, such terms as "an (or 'the') α-aminophenylacetic acid" and "an (or 'the') α-aminothienylacetic acid" are intended to include α-amino-substituted phenylacetic acids and α-amino-substituted thienylacetic acids as well as α-aminophenylacetic acid and α-aminothienylacetic acid per se.

The previous solution to the problem of isolating or reisolating such penicillins comprised first preparing a compound of the formula

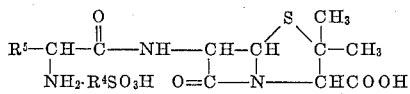

wherein $R^4$ is a member selected from the group consisting of

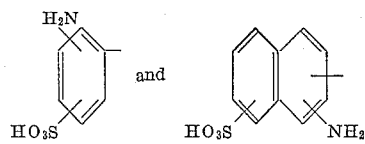

and

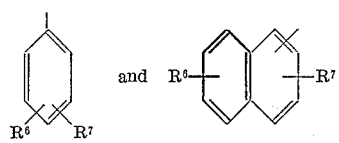

wherein $R^6$ and $R^7$ are each a member selected from the group consisting of hydrogen, alkyl containing from 1 to 12 carbon atoms (including straight and branched chain groups), (lower)alkoxy, (lower)alkylthio, nitro, (lower) alkanoylamino, (lower)alkanoyloxy, sulfamyl, chloro, iodo, bromo, fluoro, trifluoromethyl, (lower)alkylsulfonyl, carbo(lower)alkoxy, benzyl, phenethyl, cycloheptyl, cyclohexyl and cyclopentyl;

and wherein $R^5$ is a member selected from the group consisting of

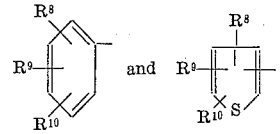

wherein $R^8$, $R^9$ and $R^{10}$ each represent a member selected from the group consisting of hydrogen, nitro, di(lower)alkylamino, (lower)alkanoylamino, (lower)alkanoyloxy, (lower)alkyl (including straight and branched chain saturated aliphatic groups having from 1 to 6 carbon atoms inclusive), (lower)alkoxy, sulfamyl, chloro, iodo, bromo, fluoro, trifluoromethyl, (lower)alkylthio, (lower)alkylsulfonyl, carbo(lower)alkoxy, benzyl, phenethyl, cycloheptyl, cyclohexyl and cyclopentyl.

Preferred compounds were the naphthalene sulfonic acid, p-nonylbenzenesulfonic acid, p-toluenesulfonic acid and p-cymenesulfonic acid salts of α-aminobenzylpenicillin and the 1:1 molar adduct of (—)-α-amino-2-thienylmethylpenicillin and 7-amino-1,3-naphthalenedisulfonic acid, the 1:1 molar adduct of (—)-α-amino-2-thienylmethylpenicillin and 6-amino-1,3-naphthalenedisulfonic acid, the 1:1 molar adduct of (—)-α-aminobenzylpenicillin and 7-amino-1,3-naphthalenedisulfonic acid and the 1:1 molar adduct of (—)-α-aminobenzylpenicillin and 6-amino-1,3-naphthalenedisulfonic acid. The same compounds are also preferred for use in the process of the present invention.

Such compounds were prepared by reaction of the penicillin in aqueous solution with the sulfonic acid or salt thereof at about pH 1.0 to 4.0 to form the indicated reaction product which precipitates as a solid and is collected.

A basic problem in the conversion of these penicillin sulfonates to the amphoteric penicillin is that neither are soluble in organic solvents and the penicillin sulfonates are, of course, highly insoluble in water. In order to avoid a very costly process of concentration by evaporation it is necessary to form the final penicillin in water under conditions which will cause it to precipitate in high yield, that is, in very concentrated aqueous solutions. Thus the desired process must involve converting one solid chemical into another in aqueous media. This precludes splitting the penicillin sulfonate to the penicillin by conventional solid ion exchange resins as the latter could not be separated from the penicillin so-produced.

The previous process of isolating these penicillins comprised preparing the salts described above, *suspending* them in water and adjusting the pH to from about 6.0–8.0 and preferably 6.7–7.2 by the addition of a tertiary amine such as triethylamine. The use of a base such as sodium hydroxide is seldom practical because the sodium salts of these sulfonic acids are generally quite insoluble in water. This addition of triethylamine caused precipitation of the penicillin to begin. The pH of the solution was then adjusted to about 4.5 to 4.6 by the addition of an acid such as HCl and cooled to complete precipitation.

The difficulty encountered in conducting the process described above was that the solid penicillin so-produced was contaminated with the sulfonic acid in the form of its triethylamine salt. This undesired coprecipitation could not be avoided by the use of larger proportions of water because that would dissolve too much of the penicillin and thus reduce the yield; any change in pH from the isoelectric point would also reduce the yield. Finally, the addition of an immiscible solvent would not serve to prevent the coprecipitation because the sulfonic acid salts formed in the previous method, i.e. triethylamine, are much more soluble in water than in any water-immiscible solvent.

These considerations made it highly desirable and the object of the present invention to discover a different method of converting the penicillin sulfonates in high yield to pure penicillins not contaminated with sulfonic acids or their salts, i.e. substantially free of any sulfonic acid contaminants.

The object of the present invention has been achieved by the provision, according to the present invention, of the process of preparing in pure form and high yield a penicillin having the formula

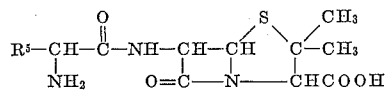

wherein $R^5$ is a member selected from the group consisting of

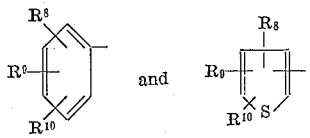

wherein $R^8$, $R^9$ and $R^{10}$ each represents a member selected from the group consisting of hydrogen, nitro, di(lower)-alkylamino, (lower)alkanoylamino, (lower)alkanoyloxy, (lower)alkyl (including straight and branched chain saturated aliphatic groups having from 1 to 6 carbon atoms inclusive), (lower)alkoxy, sulfamyl, chloro, iodo, bromo, fluoro, trifluoromethyl, (lower)alkylthio, (lower)alkylsulfonyl, carbo(lower)alkoxy, benzyl, phenethyl, cycloheptyl, cyclohexyl and cyclopentyl which comprises mixing (a) Water, and (b) A larger volume of a liquid, water-immiscible solvent; and (c) A penicillin sulfonate of the formula

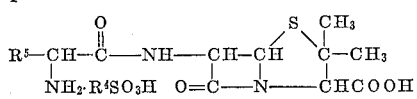

wherein $R^4$ is a member selected from the group consisting of

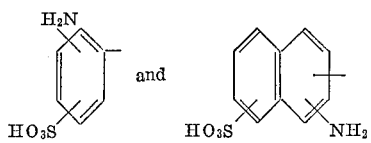

and

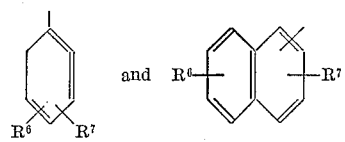

wherein $R^6$ and $R^7$ are each a member selected from the group consisting of hydrogen, alkyl containing from 1 to 12 carbon atoms (including straight and branched chain groups), (lower)alkoxy, (lower)alkylthio, nitro, (lower)alkanoylamino, (lower)alkanoyloxy, sulfamyl, chloro, iodo, bromo, fluoro, trifluoromethyl, (lower)-alkylsulfonyl, carbo(lower)alkoxy, benzyl, phenethyl, cycloheptyl, cyclohexyl and cyclopentyl, and wherein $R^5$ has the meaning set forth above, and (d) A weight equal to at least one-half the weight of said penicillin sulfonate of a secondary amine selected from the group consisting of the secondary amines having the formula

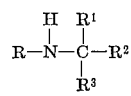

wherein R is an aliphatic goup having from 10 to 14 carbon atoms and $R^1$, $R^2$ and $R^3$ are each alkyl groups having a total of from 11 to 14 carbon atoms, said secondary amine being liquid at room temperatures and soluble in said organic solvent;

(e) Agitating said mixture; and (f) Recovering said penicillin after it forms and precipitates as a solid substantially free of any sulfonic acid contaminants.

A more limited embodiment of the present invention comprises the process of preparing in pure form and high yield a penicillin having the formula

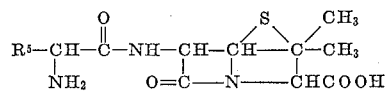

wherein $R^5$ is a member selected from the group consisting of

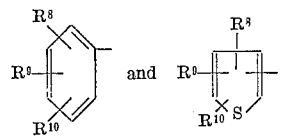

wherein $R^8$, $R^9$ and $R^{10}$ each represent a member selected from the group consisting of hydrogen, nitro, di(lower) alklamino, (lower)alkanoylamino, (lower)alkanoyloxy, (lower)alkyl (including straight and branched chain saturated aliphatic groups having from 1 to 6 carbon atoms inclusive), (lower)alkoxy, sulfamyl, chloro, iodo, bromo, fluoro, trifluoromethyl, (lower)alkylthio, (lower)alkylsulfonyl, carbo(lower)alkoxy, benzyl, phenethyl, cycloheptyl, cyclohexyl and cyclopentyl which comprises mixing (a) Water, and (b) A larger volume of a liquid, water-immiscible solvent selected from the group consisting of (lower)alkyl ketones, (lower)alkanols, (lower)aliphatic esters of (lower)alkanoic acids, halogenated (lower)hydrocarbons, benzene, toluene, xylenes and (lower)alkyl ethers; and (c) A penicillin sulfonate of the formula

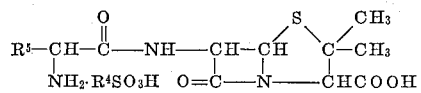

wherein $R^4$ is a member selected from the group consisting of

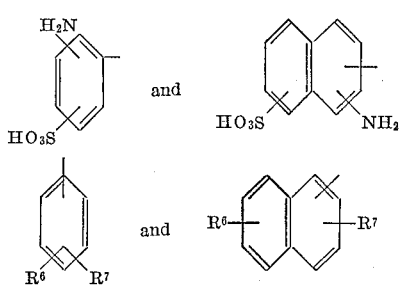

wherein $R^6$ and $R^7$ are each a member selected from the group consisting of hydrogen, alkyl containing from 1 to 12 carbon atoms (including straight and branched chain groups), (lower)alkoxy, (lower)alkylthio, nitro, (lower) alkanoylamino, (lower)alkanoyloxy, sulfamyl, chloro, iodo, bromo, fluoro, trifluoromethyl, (lower)alkylsulfonyl, carbo(lower)alkoxy, benzyl, phenethyl, cycloheptyl, cyclohexyl and cyclopentyl, and wherein $R^5$ has the meaning set forth above, and (d) A weight equal to at least one-half the weight of said penicillin sulfonate of a secondary amine selected from the group of secondary amines having the formula

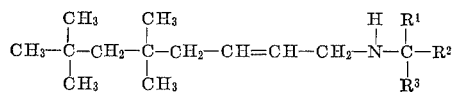

wherein each of $R^1$, $R^2$ and $R^3$ is an aliphatic hydrocarbon radical and $R^1$, $R^2$ and $R^3$ contain in the aggregate from 11 to 14 carbon atoms;

(e) Agitating said mixture; and (f) Recovering said penicillin after it forms and precipitates as a solid substantially free of any sulfonic acid contaminants.

The preferred secondary amine for use in the present invention is a mixture of secondary amines wherein each secondary amine has the formula

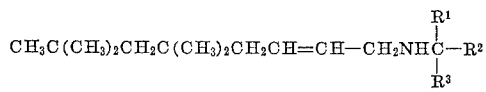

wherein each of $R^1$, $R^2$ and $R^3$ is an aliphatic hydrocarbon radical and wherein $R^1$, $R^2$ and $R^3$ contain in the aggregate from 11 to 14 carbon atoms; this particular mixture of secondary amines, which is sometimes referred to in the following examples as "Liquid Amine Mixture No. I" is available from Rohm and Haas Company, Washington Square, Philadelphia, Pa. as "Amberlite LA–1" as a clear amber liquid having the following physical characteristics: viscosity at 25° C. of 70 cps.; specific gravity at 20° C. of 0.845; refractive index at 25° C. of 1.467; distillation range at 10 mm.: up to 160° C.—4% 160 to 210° C.—5%, 210 to 220° C.—74%, above 220° C.—17%. The amount of such amines to be used is a weight which is at least 50%, generally 68 to 250% and preferably 85 to 150% of the weight of the penicillin sulfonate. Thus, for example, in one preferred embodiment, 1.2 ml. of such amine is used for each gram of α-aminobenzylpenicillin β-naphthalenesulfonate.

It is preferred that the penicillin be isolated in the form of its trihydrate, and the amine-solvent media should therefore contain at least three moles of water per mole of penicillin. In order to obtain the penicillin trihydrate, it is essential to contact the penicillinaminoaryldisulfonic acid adduct with the amine at a temperature below about 60° C. The preferred temperature range is from about 0° to 35° C. If temperatures in excess of about 60° C. are employed, the anhydrous penicillin is formed.

The water-immiscible organic solvent in which the penicillinaminoaryldisulfonic acid adduct is contacted with the amine is preferably methyl isobutyl ketone. Other solvents which can be used include other (lower) alkyl ketones, (lower)alkyl esters such as butyl acetate, halogenated (lower)hydrocarbons such as chloroform or methylene dichloride, aromatic hydrocarbons such as toluene; (lower)alkyl ethers such as diamyl ether; water immiscible (lower)alkanols; and mixture thereof with each other or with methyl isobutyl ketone. The amount of solvent used is not critical and large amounts of the solvent can be used since the resulting penicillin trihydrates are not soluble in these materials.

D-(—)-α-aminobenzylpenicillin trihydrate is relatively insoluble in water (i.e. less than about 10 mg./ml. at 20 to 25° C.), and is less soluble than D-(—)-α-aminobenzylpenicillin, and is obtained in much higher yields from aqueous systems than the corresponding anhydrous D-(—)-α-aminobenzylpenicillin. Moreover, due to the low water solubility of D-(—)-α-aminobenzylpenicillin trihydrate, this compound can be prepared from lower quality D-(—)-α-aminobenzylpenicillin aryl sulfonate systems than can anhydrous D-(—)-α-aminobenzylpenicillin since the water content of the system can be substantially increased (thereby dissolving more of the impurities) without substantially lowering the yield of the D-(—)-α-aminobenzylpenicillin trihydrate.

D-(—)-α-aminobenzylpenicillin trihydrate has an elegant and more crystalline appearance than does the corresponding anhydrous compound. Moreover, it may be stored for long periods of time without substantial potency loss. Furthermore, D-(—)α-aminobenzylpenicillin trihydrate is easier to formulate into aqueous suspensions for use orally or by injection than the corresponding anhydrous compound since it has better wettability properties.

The following examples will serve to illustrate this invention without limiting it thereto.

EXAMPLE 1

To a vigorously agitated mixture of 100 mls. of methyl isobutyl ketone there are added at 25 to 30° C. 15 mls. of water and 10 mls. of a mixture of secondary amines wherein each secondary amine has the formula

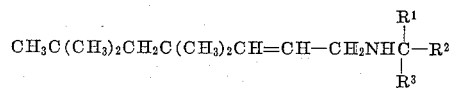

wherein each of $R^1$, $R^2$ and $R^3$ is an aliphatic hydrocarbon radical and wherein $R^1$, $R^2$ and $R^3$ contain in the aggregate of from 11 to 14 carbon atoms. This particular mixture of secondary amines, which is sometimes referred to as "Liquid Amine Mixture No. I," is a clear amber liquid having the following physical characteristics: viscosity at 25° C. of 70 cps.; specific gravity at 20° C. of 0.845; refractive index at 25° C. of 1.467; distillation range at 10 mm.: up to 160° C.—4%, 160 to 210° C.—5%, 210 to 220° C.—74%, above 220° C.—17%. To this mixture there is then added slowly over a period of 30 minutes 10 gms. of D-(—)-α-aminobenzylpenicillin beta-naphthalene sulfonate. The mixture is agitated for three hours at 25–30° C. The product, D-(—)-α-aminobenzylpenicillin trihydrate, precipitates and is collected by filtration. The filter cake of the product is washed several times with methyl isobutyl ketone and is dried at 40° C. The product is obtained in about a 90% yield and has a potency of 865 mcgs./mg. It is determined by Karl Fischer analysis to have a moisture content of 13.4% by weight.

In order to illustrate the biological stability of D-(—)-α-aminobenzylpenicillin trihydrate, 18 samples of this compound are stored at room temperature in snap-cap vials. After three to four months, the average potency loss is determined to be only 0.2%. By contrast, two samples of D-(—)-α-aminobenzylpenicillin containing 6.4% and 7.6% by weight of water which are stored at room temperature for the same length of time as the samples of D-(—)-α-aminobenzylpenicillin trihydrate are determined to lose 60% and 55%, respectively, of their potency.

EXAMPLE 2

Part A.—(—)-α-Amino-2-thienylmethylpenicillin (3.0 grams; 0.0085 mole) is slurried in 50 milliliters of water, the slurry is cooled in an ice bath, and 30 milliliters of methyl isobutyl ketone are added. To this mixture there is slowly added a solution of 4.5 grams (0.015 mole) of 6-amino-1,3-naphthalenedisulfonic acid in 10 ml. of water. Crystallization begins immediately, and the pH is maintained at 1.7 during the addition of the final increments of the aminonaphthalenedisulfonic acid by the periodic addition of triethylamine. The resulting heavy slurry is stirred in an ice bath for two hours and the solid is removed by filtration, washed with small portions of iced water, methyl isobutyl ketone and "Skellysolve B," and dried in vacuo over $P_2O_5$. The product, the 1:1 molar adduct of (—)-α-amino-2-thienylmethylpenicillin and 6-amino-1,3-naphthalenedisulfonic acid, is found to weigh 4.5 grams.

Part B.—The adduct obtained above (4.5 grams) is slurried in a mixture of 50 milliliters of methyl isobutyl ketone, ten milliliters of water and 7.5 milliliters of Liquid Amine No. I and stirred for four hours at room temperature. The solid product is removed by filtration, washed with a small portion of methyl isobutyl ketone, and dried in vacuo. The product, (—)-α-amino-2-thienylmethylpenicillin trihydrate, is found to weigh 2.96 grams, to contain 11.3% water as determined by Karl Fischer analysis and to have a bio-activity equivalent to 1077 micrograms of (—)-α-aminobenzylpenicillin per milligram.

EXAMPLE 3

The procedure of Example 2, Part B is repeated using 15 milliliters of water and 15 milliliters of Liquid Amine No. I. The product, (—)-α-amino-2-thienylmethylpenicillin trihydrate weighs 2.7 grams, contains 12.8% water as determined by Karl Fischer analysis and has a bio-activity equivalent to 1040 micrograms of (—)-α-aminobenzylpenicillin per milligram.

Starting materials

Methods for the preparation of the penicillin sulfonates used in the process of the present invention are apparent from the following illustrative procedures:

PROCEDURE 1

A reaction mixture containing α-aminobenzylpenicillin, formed by the acylation of 1 kg. of 6-aminopenicillanic acid, is concentrated at less than 40° C. to about 15 liters. Methyl isobutyl ketone (7.5 l.) is added to the concentrate which is then chilled to 0–5° C., adjusted to pH 1.8–2.0, agitated about five minutes, the resulting emulsion filtered and the filtrates collected. The filter cake is washed with two 1. of cold water and then with 2.5 l. of methyl isobutyl ketone and these wash portions are combined with the filtrate. The aqueous layer and the methyl isobutyl ketone layer of the filtrate are then separated and the organic solvent layer is discarded. The aqueous layer is adjusted to pH 4–5 with triethylamine, maintained at 0–10° C. and mixed with 7.5 l. of methyl isobutyl ketone. To the resulting mixture there is added with vigorous agitation 3 l. of an aqueous solution containing 1.35 kg. of β-naphthalene sulfonic acid. During addition of the β-naphthalene sulfonic acid, the reaction mixture is not allowed to exceed 10° C. and the pH is maintained above 1.5 by intermittent addition of triethylamine as required. Following the addition of the acid solution, the pH of the reaction mixture is adjusted to 1.6–2.0, seeded, and agitated for 2 to 4 hours at 0 to 5° C. and at a pH of 1.6 to 2.0 whereupon α-aminobenzylpenicillin·β-naphthalene sulfonic acid salt precipitates. After precipitation of the product is completed, the reaction mixture is filtered and the collected product washed twice with 2.5 l. of cold water and with three successive washes of 2.5 l. of methyl isobutyl ketone. The collected product, the monohydrate of β-naphthalene sulfonic acid salt of α-aminobenzylpenicillin is dried at 50° C. and found by bioassay to have 600 mcg. α-aminobenzylpenicillin activity/mg. The theoretical activity of α-aminobenzylpenicillin·β-naphthalene sulfonic acid salt monohydrate is 606 mcg. α-aminobenzylpenicillin/mg. The product inhibits Staph. aureus Smith at concentrations of 0.001% by weight.

PROCEDURE 2

An aqueous reaction mixture (300 ml.) which has been formed by the acylation of 6-aminopenicillanic acid and which contains α-amino-meta-chlorobenzylpenicillin in admixture with various impurities is filtered. The filtrate (pH 7.1) is adjusted to pH 5.0 and ammonium β-naphthalene sulfonate (2.9 g.) is added with rapid stirring. The pH of the clear, yellow solution is slowly lowered to 2.0 with concentrated $H_2SO_4$ causing a quantity of oil and gum to separate. The mixture is then layered with 60 ml. of methyl isobutyl ketone and the mixture is stirred vigorously with occasional scratching. In a short time, the β-naphthalene sulfonate of α-amino-meta-chlorobenzylpenicillin crystallizes from the solution. The crystalline product is collected by filtration and, while still slightly damp, is suspended in 75 ml. of water. The pH of the suspension is adjusted to 7.5 by the addition of triethylamine. At first, most of the solid material dissolves. Then, a crystalline material begins to separate. The pH of the mixture is adjusted to 4.3 by the addition of 6 N HCl. After ½ hour, the precipitated crystalline material is collected by filtration, dried overnight in vacuo over $P_2O_5$.

PROCEDURE 3

α-Aminobenzylpenicillin (2 g.) is dissolved in 70 ml. of water and the pH of the solution is adjusted to 7.8 by the addition of $NH_4OH$. A clear solution results. A solution comprising 2.50 g. of p-nonylbenzene sulfonic acid in 10 ml. of water, the pH of which has been adjusted to 2.5 by the addition of 20% $H_2SO_4$, is added to the solution of α-aminobenzylpenicillin. There is then added 20 ml. of methyl isobutyl ketone and the pH of the mixture is adjusted to 1.5. Crystal formation commences at this point. The mixture is chilled for one hour, filtered, washed with water and 4 ml. of methyl isobutyl ketone and dried at 50° C. The product (3.45 g.) is the monohydrate of the p-nonylbenzene sulfonic acid salt of α-aminobenzylpenicillin. It has an activity of 535 mcg./mg. and is determined to contain the β-lactam structure by infra-red analysis. The product inhibits Staph. aureus Smith at concentrations of 0.001% by weight.

PROCEDURE 4

α-Aminobenzylpenicillin (2.0 g.) is dissolved in 40 ml. of water having a pH of 7.9. To the clear solution there is added a solution (pH 2.5) of 1.93 g. of sodium p-cymene sulfonate in 10 ml. of water. There are then added to the mixture 20 ml. of methyl isobutyl ketone and the pH of the mixture is adjusted to 1.5. The mixture is chilled, whereupon crystallization occurs. The precipitated product is recovered by filtration, washed with water and Skellysolve B and dried. The product (3.0 g.) is determined by infra-red and elemental analysis to be the trihydrate of p-cymene sulfonic acid salt of α-aminobenzylpenicillin and to have an activity of 610 mcg./mg. The product inhibits Staph. aureus Smith at concentrations of 0.001% by weight.

PROCEDURE 5

α-Aminobenzylpenicillin (2.0 g.) is dissolved in 40 ml. of water having a pH of 7.7. To this clear solution there is added 1.6 g. of sodium toluene sulfonate dissolved in 10 ml. of water. The pH of the clear solution is adjusted to 2.0 and 10 ml. of methyl isobutyl ketone is added. The pH of the mixture is adjusted to 1.5, and the mixture is chilled for one hour whereupon crystallization occurs. The precipitated product is recovered by filtration, washed with water and Skellysolve B and dried. The product (1.6 g.) is found to have an activity of 690 mcg./mg. and is determined to be α-aminobenzylpenicillin toluene sulfonate. The product inhibits Staph. aureus Smith at concentrations of 0.001% by weight.

PROCEDURE 6

To a rapidly stirred solution of the sodium salt of (—)-α-aminobenzylpenicillin (1.0 gram, 0.0027 mole) in 20 ml. of water at 25° C. there is slowly added 0.94 gram (0.0027 mole) of the disodium salt of 6-amino-1,3-naphthalenedisulfonic acid. The pH is adjusted to 1.7 with hydrochloric acid, whereupon a crystalline solid precipitates. Stirring is continued for an additional thirty minutes, and the mixture is then filtered. The crystalline solid is washed with methyl isobutyl ketone, dried in vacuo over $P_2O_5$ and is found to weigh 0.4 gram. The product, the 1:1 adduct of (—)-α-aminobenzylpenicillin and 6-amino-1,3-naphthalenedisulfonic acid, has an activity of 525 micrograms of (—)-α-aminobenzylpenicillin per milligram.

PROCEDURE 7

Part A.—A solution of the sodium salt of (—)-α-aminobenzylpenicillin (3.0 grams, 0.0081 mole) in 60 ml. of ice water is layered with 30 ml. of methyl isobutyl ketone and stirred rapidly while 3.5 grams (0.0112 mole) of solid 6-amino-1,3-naphthalenedisulfonic acid is slowly added. The mixture is acidified to pH 1.7 with hydrochloric acid, and the resulting slurry is cooled in ice, with stirring, for one hour and collected by filtration. The crystalline solid is washed with 20 ml. of iced water and with a small portion of methyl isobutyl ketone. After drying in vacuo, the product, the 1:1 adduct of (—)-α-aminobenzylpenicillin and 6-amino-1,3-naphthalenedisulfonic acid, is found to weigh 4.0 grams.

*Part B.*—The product prepared in Part A above, when obtained in hydrated form, is slurried in 50 ml. of dry acetone and the slurry is stirred for three hours at 25–30° C. and collected by filtration. The filter cake is washed with 20 ml. of dry acetone and dried at 50° C. The product, the anhydrous 1:1 adduct of (—)-α-aminobenzylpenicillin and 6-amino-1,3-naphthalenedisulfonic acid, is very heat stable.

PROCEDURE 8

A solution of 3.0 grams (0.0081 mole) of the sodium salt of (—)-α-aminobenzylpenicillin in 60 ml. of water is layered with 30 ml. of methyl isobutyl ketone and stirred rapidly while 3.5 grams (0.0112 mole) of 7-amino-1,3-naphthalenedisulfonic acid is slowly added. The resulting mixture has a pH of 5.9. Sufficient hydrochloric acid is added to adjust the pH of the mixture to 1.7, whereupon a crystalline solid forms. The resulting slurry is stirred for an additional two hours at 0° C. and collected by filtration. The solid is washed with a small portion of methyl isobutyl ketone, with 20 ml. of iced water which has been adjusted to a pH of 2.0 with hydrochloric acid, and with another small portion of methyl isobutyl ketone. After drying in vacuo over $P_2O_5$ the product, the 1:1 adduct of (—)-α-aminobenzylpenicillin and 7-amino-1,3-naphthalenedisulfonic acid, is found to weight 4.95 grams.

PROCEDURE 9

6-amino-1,3-naphthalenedisulfonic acid (2.7 grams, 0.0089 mole) is dissolved in a mixture of 10 ml. of water and 40 ml. of acetone. To this solution there is added 2.5 grams (0.0072 mole) of (—)-α-aminobenzylpenicillin; the resulting solution has a pH of 1.5. Upon the addition of 50 ml. of acetone, fine needle-like crystals slowly precipitate from the solution. The mixture is filtered, and the crystalline solid thus collected is dried in vacuo over $P_2O_5$. The product, the 1:1 adduct of (—)-α-aminobenzylpenicillin and 6-amino - 1,3 - naphthalenedisulfonic acid, is found to weigh 3.2 grams.

PROCEDURE 10

α-Aminobenzylpenicillin (5.0 grams, 0.0143 mole) is dissolved in a mixture of 20 ml. of water and 80 ml. of acetone. To this stirred solution, which has a pH of 2.0, there is slowly added a solution of 5.4 grams (0.0178 mole) of 6-amino - 1,3 - naphthalenedisulfonic acid in 7 ml. of water. The resulting solution has a pH of 1.0. The solution is cooled to 0° C., whereupon a crystalline solid slowly forms. Acetone (100 ml.) is added, and the solution is stirred for another thirty minutes and filtered. The collected solid product, the 1:1 adduct of α-aminobenzylpenicillin and 6-amino - 1,3 - naphthalenedisulfonic acid, is washed with acetone, dried in vacuo and found to weigh 5.1 grams.

PROCEDURE 11

To a stirred solution of 5.0 grams (0.0143 mole) of (—)-α-aminobenzylpenicillin in 20 ml. of water and 80 ml. of acetone at 0° C., there is slowly added 4.35 grams (0.0143 mole) of 6-amino - 1,3 - naphthalenedisulfonic acid. The pH of this solution is found to be 2.1. An additional 0.5 gram portion of 6-amino-1,3-naphthalenedisulfonic acid is added, and the pH drops to 1.75. A third portion of 0.25 gram (for a total of 0.0168 mole) of 6-amino-1,3-naphthalenedisulfonic acid is added, and the pH of the solution is then found to be 1.6. The addition of 15 ml. of acetone causes a heavy precipitation of crystalline solid. Additional small portions of acetone (a total of 100 ml.) are added at intervals over a period of thirty minutes. The resulting slurry is collected by filtration and the solid product, the 1:1 adduct of α-aminobenzylpenicillin and 6-amino - 1,3 - naphthalenedisulfonic acid, is dried in vacuo and found to weigh 5.2 grams and to have an activity of 480 micrograms of (—)-α-aminobenzylpenicillin per milligram. A second crop of product is obtained from the mother liquor and is found to weigh 1.29 grams and to have an activity of 415 micrograms of (—)-α-aminobenzylpenicillin per milligram.

PROCEDURE 12

*Part A.*—One gram (0.0027 mole) of the sodium salt of (—)-α-aminobenzylpenicillin is dissolved in 20 ml. of water to form a solution having a pH of 9.2. To this solution there is added 0.816 gram (0.0027 mole) of 7-amino - 1,3 - naphthalenedisulfonic acid to give a clear solution having a pH of 6.8. The pH is adjusted to 4.0 with hydrochloric acid, at which time the solution becomes turbid. The addition of additional hydrochloric acid to a pH of 1.7 causes the formation of a heavy precipitate of crystalline solid. One hundred ml. of water is added and the slurry is stirred for 15 minutes at room temperature and filtered. The solid thus collected was washed with small portions of water and methyl isobutyl ketone, dried in vacuo over $P_2O_5$ and found to weigh 0.82 gram. The product, shown by infrared analysis to be a hydrate of the 1:1 adduct of (—)-α-aminobenzylpenicillin and 7-amino-1,3-naphthalenedisulfonic acid, had an activity of 510 micrograms of (—)-α-aminobenzylpenicillin per milligram.

PROCEDURE 13

*Part A.—Preparation of starting materials*

(1). α-(2-thienyl)hydantoin.—Sodium cyanide (875 grams; 17.84 moles) and ammonium carbonate (4,050 grams; 41.8 moles) are dissolved in 12 liters of distilled water. To this solution there is added a solution of 1,000 grams (8.92 moles) of α-thiophenealdehyde in 12 liters of methanol. The addition and subsequent reaction are carried out under a blanket of nitrogen to prevent oxidation of the aldehyde. The mixture is heated to 50–55° C. with stirring for four hours, during which time it changes in color from white to deep yellow. The reaction mixture is cooled to room temperature and filtered, and the solid is washed with two one-liter portions of methanol.

The combined filtrate and washes are concentrated under reduced pressure to approximately one third their original volume. The pH of the solution is slowly adjusted to 2.0 with concentrated hydrochloric acid, taking the necessary precautions for disposal of the large amount of liberated HCN. The solution is heated to 95–100° C. for ten minutes and 200 grams of decolorizing carbon is added. The solution is heated for another five minutes and filtered. The carbon cake is washed with 500 ml. of water and the combined filtrate and wash is cooled in an ice bath for one hour to yield a light yellow crystalline precipitate, which is collected by filtration and washed with a small amount of water. The product, α-(2-thienyl)hydantoin, is found to weigh about 950 grams after drying.

(2) *DL - α-amino-2-thienylacetic acid.*—α-(2-thienyl) hydantoin (1,000 grams; 5.5 moles) is added to 4,000 ml. of 20% aqueous sodium hydroxide solution, and the mixture is refluxed for 17 hours. Fifty grams of decolorizing carbon is added, and the mixture is stirred for about five minutes. The hot reaction solution is filtered, and the filter cake is washed with one displacement of water. The combined filtrate and wash is cooled and slowly acidified with glacial acetic acid to a pH of 7.0. The resulting slurry is cooled to 15–20° C., filtered, and the filter cake is washed with one liter of cold water. The filter cake is suspended in two liters of distilled water and sufficient concentrated hydrochloric acid is added to dissolve the crude product (the resulting pH is approximately 1.0). A small amount of tarry material is found to be insoluble. Fifty grams of decolorizing carbon is added, the mixture is stirred for five minutes and filtered hot. The filter cake is washed with 200 ml. of water and the combined filtrate and wash is adjusted to pH 4.5 of $NH_4OH$ and the combined filtrate and wash are chilled in an ice bath for one hour. The resulting slurry is filtered and washed with 250 ml. of iced water. The solid product, DL-α-amino-2-thienylacetic acid, is dried at 45–50° C.

(3) (−) - α - *Amino-2-thienylacetic acid*.—d-10-camphorsulfonic acid (1620 grams; 7.0 moles) is dissolved in 9.7 liters of isopropanol at 60° C. This solution is heated to just below its boiling point and 1,000 grams (6.36 moles) of DL-α-amino-2-thienylacetic acid is added with stirring. The mixture is heated at the boiling point for a few minutes to obtain essentially complete solution and filtered hot through a heated filter. The filtered solution is stirred slowly and cooled to room temperature over a period of six hours. It is allowed to remain at room temperature for an additional ten hours to complete the crystallization. The crystalline solid is recovered by filtration, washed with three liters of isopropanol and dried at 45–50° C. The product, the d-10-camphorsulfonic acid salt of (−)-α-amino-2-thienylacetic acid, is found to weigh 850 grams.

One thousand grams of the d-10-camphorsulfonic acid salt of α-amino-2-thienylacetic acid is slurried in three liters of distilled water and the pH of the slurry is adjusted to 5.5 by the slow addition of $NH_4OH$. After the pH has been adjusted to 5.5, an additional two liters of methanol is added to the slurry, and the slurry is stirred for an additional 20-minute period. The pH is readjusted as necessary to maintain it at 5.5. The slurry is cooled to 0° C. for one hour, filtered and the filter cake is washed with one liter of cold methanol-water solution (two parts methanol to one part water) and with three liters of methanol. The solid product, (−)-α-amino-2-thienylacetic acid is dried at 45–50° C. and is found to weigh about 330 grams. It melts with decomposition at 189–191° C. and has an optical rotation of $[\alpha]_D^{23}=-73.7°$ C. (concentration equals 1.0% in water).

(4) (−)-α-*Amino-2-thienylacetyl chloride hydrochloride*.—Dry hydrogen chloride gas is bubbled into a suspension of 17 grams (0.108 mole) of (−)-α-amino-2-thienylacetic acid in 200 ml. of methylene dichloride for a period of eight minutes at room temperature. The suspension is cooled to −10° C. with stirring and 29 grams (0.141 mole) of $PCl_5$ are added. Stirring is continued for three hours at a temperature of −8 to −5° C. and for an additional three hours at 0° to 2° C. The suspension is filtered and the solid material is washed with a small portion of methylene dichloride and dried in vacuo over $P_2O_5$. The product, (−)-α-amino-2-thienylacetyl chloride hydrochloride is found to weigh 21.2 grams.

*Part B.—Preparation of* (−)-α-*amino-2-thienylmethylpenicillin*

6-aminopenicillanic acid (23.8 grams; 0.11 mole) is dissolved in 275 ml. of iced water by the addition of dilute NaOH to a pH of 7.2. To this solution (a total of 320 ml.) there is added 1,280 ml. of cold acetone. The solution is cooled to 0° C., and the pH is adjusted to 3.5 with hydrochloric acid. To the stirred solution there is added 21.2 grams (0.1 mole) of (−)-α-amino-2-thienylacetyl chloride hydrochloride over a period of twenty minutes. The pH is maintained between 2.5 and 3.0 during the reaction by the periodic addition of dilute NaOH. At the end of the twenty minute reaction time, the temperature has risen to 5° C. The pH is adjusted to 2.9, and stirring is continued for an additional fifteen minutes. Methyl isobutyl ketone (2,560 ml.) is added, and, after thorough mixing, the aqueous layer is separated. The methyl isobutyl ketone layer is extracted with a second 200 ml. portion of water and with a third 100 ml. portion of water. The combined aqueous layers are adjusted to pH 4.7, 250 ml. of methyl isobutyl ketone is added, and the mixture is concentrated under vacuum to approximately 350 ml., at which time a crystalline solid forms. The mixture is filtered, and the solid material is washed with small portions of water and methyl isobutyl ketone and dried in vacuo over $P_2O_5$. The resulting product, (−)-α-amino-2-thienylmethylpenicillin trihydrate, is found to weigh 10.7 grams and to inhibit the growth of *Staphylococcus aureus* Smith.

*Part C.—Preparation of the adduct of* (−)α-*amino-2-thienylmethylpenicillin and 7-amino-1,2-naphthalenedisulfonic acid*

The combined mother liquor and methyl isobutyl ketone washes from Part B, above, are cooled to 0° C., and there is added a solution of 30.0 grams (0.099 mole) of 7-amino-1,3-naphthalenedisulfonic acid in 200 ml. of water. The pH is adjusted from 3.7 to 2.4, whereupon crystallization begins. The pH is adjusted to 1.8 with concentrated HCl, and the resulting slurry is stirred for one hour in an ice bath and filtered. The solid material is washed with small portions of iced water and methyl isobutyl ketone, and dried in vacuo over $P_2O_5$. The product, the 1:1 molar adduct of (−)-α-amino-2-thienylmethylpenicillin and 7-amino-1,3-naphthalenedisulfonic acid, is found to weigh 14.5 grams.

PROCEDURE 15

*Part A.*—6-aminopenicillanic acid (47.6 grams, 0.22 mole) is dissolved in 640 ml. of iced water by the addition of dilute NaOH to a pH of 7.2. To this solution there is added 2.56 liters of cold acetone, the solution is cooled to 0° C., and the pH is adjusted to 3.5 by the addition of 45 ml. of concentrated HCl. The solution is stirred, and 61.0 grams (0.288 mole) of (−)-α-amino-2-thienylacetylchloride hydrochloride is added over a period of twenty minutes, while maintaining the pH between 2.8 and 3.3. The reaction mixture is stirred for an additional twenty minutes and 6.4 liters of methyl isobutyl ketone are added. The aqueous layer is separated, and the methyl isobutyl ketone layer is extracted with two additional 200 ml. portions of water. The combined aqueous layers are adjusted to a pH of 4.7, 400 ml. of methyl isobutyl ketone is added, and the mixture is concentrated under vacuum until crystallization begins. The crystalline solid is removed by filtration, washed with small portions of iced water and methyl isobutyl ketone, and flashed to a semi-dry solid with lower alkanes ("Skellysolve B"). After drying in vacuo over $P_2O_5$, the product, (−)-α-amino-2-thienylmethylpenicillin trihydrate, is found to weigh 22.5 grams.

*Part B.*—The combined mother liquor and washes from Part A, above, are cooled to 0° C., and a solution of 45 grams (0.148 mole) of 7-amino-1,3-naphthalenedisulfonic acid in 300 ml. of water is added. The pH is adjusted to 1.6 and the resulting slurry is stirred for one hour. The crystalline solid is removed by filtration, washed with small portions of iced water and methyl isobutyl ketone, and dried in vacuo over $P_2O_5$. The product, the 1:1 molar adduct of (−)-α-amino-2-thienylmethylpenicillin and 7-amino - 1,3-naphthalene-disulfonic acid, is found to weigh 18.0 grams.

PROCEDURE 16

*Part A.*—(−)-α-Amino - 2-thienylmethylpencillin (3.0 grams; 0.0085 mole) is slurried in 50 milliliters of water, the slurry is cooled in an ice bath, and 30 milliliters of methyl isobutyl ketone are added. To this mixture there is slowly added a solution of 4.5 grams (0.015 mole) of 6-amino-1,3-naphthalenedisulfonic acid in 10 ml. of water. Crystallization begins immediately, and the pH is maintained at 1.7 during the addition of the final increments of the aminonaphthalenedisulfonic acid by the periodic addition of triethylamine. The resulting heavy slurry is stirred in an ice bath for two hours and the solid is removed by filtration, washed with small portions of iced water, methyl isobutyl ketone and "Skellysolve B," and dried in vacuo over $P_2O_5$. The product, the 1:1 molar adduct of (—)-α-amino-2-thienylmethylpenicillin and 6-amino-1,3-naphthalenedisulfonic acid, is found to weigh 4.5 grams.

We claim:

1. The process of preparing in pure form and high yield a penicillin having the formula $$R^5-CH(NH_2)-C(O)-NH-CH-CH\begin{pmatrix}S\\O=C-N\end{pmatrix}C(CH_3)_2-CHCOOH$$

wherein $R^5$ is a member selected from the group consisting of

[structures with $R^8$, $R^9$, $R^{10}$ on phenyl and thienyl rings]

wherein $R^8$, $R^9$ and $R^{10}$ each represent a member selected from the group consisting of hydrogen, nitro, di(lower)alkylamino, (lower)alkanoylamino, (lower)alkanoyloxy, (lower)alkyl (including straight and branched chain saturated aliphatic groups having from 1 to 6 carbon atoms inclusive), (lower)alkoxy, sulfamyl, chloro, iodo, bromo, fluoro, trifluoromethyl, (lower)alkylthio, (lower)alkylsulfonyl, carbo(lower)alkoxy, benzyl, phenethyl, cycloheptyl, cyclohexyl and cyclopentyl which comprises mixing (a) water,
(b) a larger volume of a liquid, water-immiscible solvent,
(c) a penicillin sulfonate of the formula $$R^5-CH(NH_2 \cdot R^4SO_3H)-C(O)-NH-CH-CH\begin{pmatrix}S\\O=C-N\end{pmatrix}C(CH_3)_2-CHCOOH$$

wherein $R_4$ is a member selected from the group consisting of

[structures with $H_2N$, $HO_3S$ on phenyl and naphthyl rings]

and

[structures with $R^6$, $R^7$ on phenyl and naphthyl rings]

wherein $R^6$ and $R^7$ are each a member selected from the group consisting of hydrogen, alkyl containing from 1 to 12 carbon atoms (including straight and branched chain groups), (lower)alkoxy, (lower)alkylthio, nitro, (lower)alkanoylamino, (lower)alkanoyloxy, sulfamyl, chloro, iodo, bromo, fluoro, trifluoromethyl, (lower)alkylsulfonyl, carbo(lower)alkoxy, benzyl, phenethyl, cycloheptyl, cyclohexyl and cyclopentyl, and wherein $R^5$ has the meaning set forth above, and (d) a weight equal to at least one-half the weight of said penicillin sulfonate of a secondary amine selected from the group consisting of the secondary amines having the formula $$R-N(H)-C(R^1)(R^3)-R^2$$

wherein R is an aliphatic group having from 10 to 14 carbon atoms and $R^1$, $R^2$ and $R^3$ are each alkyl groups having a total of from 11 to 14 carbon atoms, said secondary amine being liquid at room temperatures and soluble in said organic solvent;

(e) agitating said mixture; and
(f) recovering said penicillin after it forms and precipitates as a solid substantially free of any sulfonic acid contaminants.

2. The process of preparing in pure form and high yield a penicillin having the formula $$R^5-CH(NH_2)-C(O)-NH-CH-CH\begin{pmatrix}S\\O=C-N\end{pmatrix}C(CH_3)_2-CHCOOH$$

wherein $R^5$ is a member selected from the group consisting of

[structures with $R^8$, $R^9$, $R^{10}$ on phenyl and thienyl rings]

wherein $R^8$, $R^9$ and $R^{10}$ each represent a member selected from the group consisting of hydrogen, nitro, di(lower)alkylamino, (lower)alkanoylamino, (lower)alkanoyloxy, (lower)alkyl (including straight and branched chain saturated aliphatic groups having from 1 to 6 carbon atoms inclusive), (lower)alkoxy, sulfamyl, chloro, iodo, bromo, fluoro, trifluoromethyl, (lower)alkylthio, (lower)alkylsulfonyl, carbo(lower)alkoxy, benzyl, phenethyl, cycloheptyl, cyclohexyl and cyclopentyl which comprises mixing (a) water,
(b) a larger volume of a liquid, water-immiscible solvent,
(c) a penicillin sulfonate of the formula $$R^5-CH(NH_2 \cdot R^4SO_3H)-C(O)-NH-CH-CH\begin{pmatrix}S\\O=C-N\end{pmatrix}C(CH_3)_2-CHCOOH$$

wherein $R^4$ is a member selected from the group consisting of

[structures with $H_2N$, $HO_3S$, $NH_2$ on phenyl and naphthyl rings]

and

[structures with $R^6$, $R^7$ on phenyl and naphthyl rings]

wherein $R^6$ and $R^7$ are each a member selected from the group consisting of hydrogen, alkyl containing from 1 to 12 carbon atoms (including straight and branched chain groups), (lower)alkoxy, (lower)alkylthio, nitro, (lower)alkanoylamino, (lower)alkanoyloxy, sulfamyl, chloro, iodo, bromo, fluoro, trifluoromethyl, (lower)alkylsulfonyl, carbo(lower)alkoxy, benzyl, phenethyl, cycloheptyl, cyclohexyl and cyclopentyl, and wherein $R^5$ has the meaning set forth above, and (d) a weight equal to at least one-half the weight of said penicillin sulfonate of a secondary amine selected from the group of secondary amines having the formula $$CH_3-C(CH_3)_2-CH_2-C(CH_3)_2-CH_2-CH=CH-CH_2-N(H)-C(R^1)(R^3)-R^2$$

wherein each of $R^1$, $R^2$ and $R^3$ is an aliphatic hydrocarbon radical and $R^1$, $R^2$ and $R^3$ contain in the aggregate from 11 to 14 carbon atoms;

(e) agitating said mixture; and
(f) recovering said penicillin after it forms and precipitates as a solid substantially free of any sulfonic acid contaminants.

3. The process of preparing in pure form and high yield a penicillin having the formula

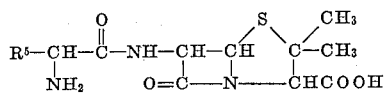

wherein $R^5$ is a member selected from the group consisting of

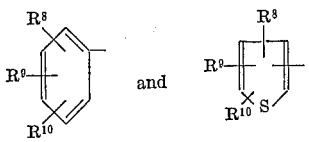

wherein $R^8$, $R^9$ and $R^{10}$ each represent a member selected from the group consisting of hydrogen, nitro, di(lower)alkylamino, (lower)alkanoylamino, (lower)alkanoyloxy, (lower)alkyl (including straight and branched chain saturated aliphatic groups having from 1 to 6 carbon atoms inclusive), (lower)alkoxy, sulfamyl, chloro, iodo, bromo, fluoro, trifluoromethyl, (lower)alkylthio, (lower)alkylsulfonyl, carbo(lower)alkoxy, benzyl, phenethyl, cycloheptyl, cyclohexyl and cyclopentyl which comprises mixing (a) water,
(b) a larger volume of a liquid, water-immiscible solvent selected from the group consisting of (lower)alkyl ketones, (lower)alkanols, (lower)aliphatic esters of (lower)alkanoic acids, halogenated (lower)hydrocarbons, benzene, toluene, xylenes and (lower)alkyl ethers; and
(c) a penicillin sulfonate of the formula

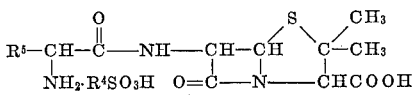

wherein $R^4$ is a member selected from the group consisting of

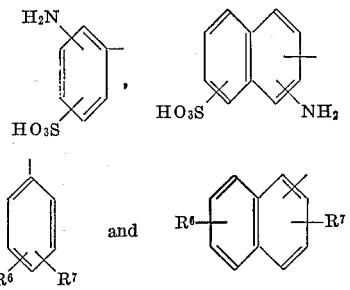

wherein $R^6$ and $R^7$ are each a member selected from the group consisting of hydrogen, alkyl containing from 1 to 12 carbon atoms (including straight and branched chain groups), (lower)alkoxy, (lower)alkylthio, nitro, (lower)alkanoylamino, (lower)alkanoyloxy, sulfamyl, chloro, iodo, bromo, fluoro, trifluoromethyl, (lower)alkylsulfonyl, carbo(lower)alkoxy, benzyl, phenethyl, cycloheptyl, cyclohexyl and cyclopentyl, and wherein $R_5$ has the meaning set forth above, and (d) a weight equal to at least one-half the weight of said penicillin sulfonate of a secondary amine selected from the group of secondary amines having the formula

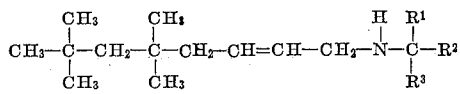

wherein each of $R^1$, $R^2$ and $R^3$ is an aliphatic hydrocarbon radical and $R^1$, $R^2$ and $R^3$ contain in the aggregate from 11 to 14 carbon atoms;

(e) agitating said mixture; and
(f) recovering said penicillin after it forms and precipitates as a solid substantially free of any sulfonic acid contaminants.

4. The process of preparing in pure form and high yield the penicillin having the formula

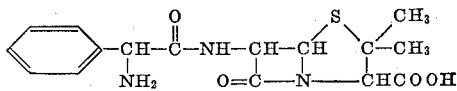

which comprises mixing
(a) water,
(b) a larger volume of a water-immiscible solvent,
(c) a penicillin sulfonate of the formula

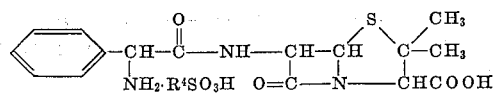

wherein $R^4$ is a member selected from the group consisting of

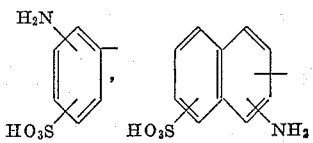

and

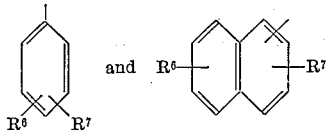

wherein $R^6$ and $R^7$ are each a member selected from the group consisting of hydrogen, alkyl containing from 1 to 12 carbon atoms (including straight and branched chain groups), (lower)alkoxy, (lower)alkylthio, nitro, (lower)alkanoylamino, (lower)alkanoyloxy, sulfamyl, chloro, iodo, bromo, fluoro, trifluoromethyl, (lower)alkylsulfonyl, carbo(lower)alkoxy, benzyl, phenethyl, cycloheptyl, cyclohexyl and cyclopentyl, and (d) a weight equal to at least one-half the weight of said penicillin sulfonate of a secondary amine selected from the group consisting of the secondary amines having the formula

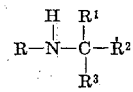

wherein R is an aliphatic group having from 10 to 14 carbon atoms and $R^1$, $R^2$ and $R^3$ are each alkyl groups having a total of from 11 to 14 carbon atoms, said secondary amine being liquid at room temperatures and soluble in said organic solvent;

(e) agitating said mixture; and
(f) recovering said penicillin after it forms and precipitates as a solid substantially free of any sulfonic acid contaminants.

5. The process of preparing in pure form and high yield the penicillin having the formula

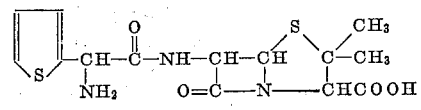

which comprises mixing
(a) water,
(b) a larger volume of a water-immiscible solvent,
(c) a penicillin sulfonate of the formula

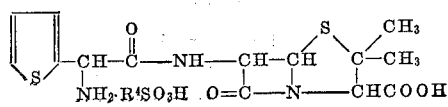

wherein R⁴ is a member selected from the group consisting of

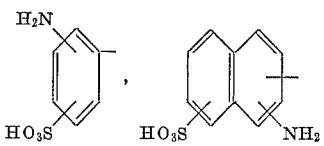

and

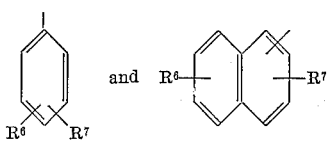

wherein R⁶ and R⁷ are each a member selected from the group consisting of hydrogen, alkyl containing from 1 to 12 carbon atoms (including straight and branched chain groups), (lower)alkoxy, (lower)alkylthio, nitro, (lower)-alkanoylamino, (lower)alkanoyloxy, sulfamyl, chloro, iodo, bromo, fluoro, trifluoromethyl, (lower)alkylsulfonyl, carbo(lower)alkoxy, benzyl, phenethyl, cycloheptyl, cyclohexyl and cyclopentyl, and (d) a weight equal to at least one-half the weight of said penicillin sulfonate of a secondary amine selected from the group consisting of the secondary amines having the formula

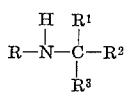

wherein R is an aliphatic group having from 10 to 14 carbon atoms and R¹, R² and R³ are each alkyl groups having a total of from 11 to 14 carbon atoms, said secondary amine being liquid at room temperatures and soluble in said organic solvent;

(e) agitating said mixture; and
(f) recovering said penicillin after it forms and precipitates as a solid substantially free of any sulfonic acid contaminants.

6. The process of preparing in pure form and high yield the penicillin having the formula

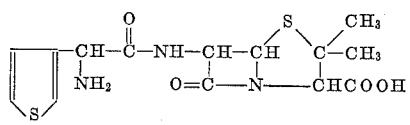

which comprises mixing
(a) water,
(b) a larger volume of a water-immiscible solvent,
(c) a penicillin sulfonate of the formula

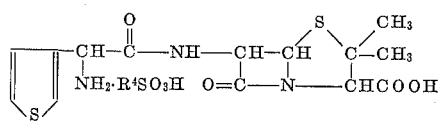

wherein R⁴ is a member selected from the group consisting of

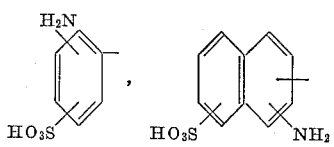

and

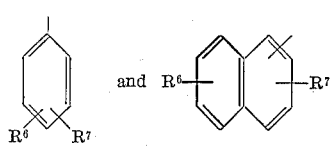

wherein R⁶ and R⁷ are each a member selected from the group consisting of hydrogen, alkyl containing from 1 to 12 carbon atoms (including straight and branched chain groups), (lower)alkoxy, (lower)alkylthio, nitro, (lower)-alkanoylamino, (lower)alkanoyloxy, sulfamyl, chloro, iodo, bromo, fluoro, trifluoromethyl, (lower)alkylsulfonyl, carbo(lower)alkoxy, benzyl, phenethyl, cycloheptyl, cyclohexyl and cyclopentyl, and (d) a weight equal to at least one-half the weight of said penicillin sulfonate of a secondary amine selected from the group consisting of the secondary amines having the formula

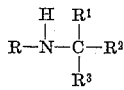

wherein R is an aliphatic group having from 10 to 14 carbon atoms and R¹, R² and R³ are each alkyl groups having a total of from 11 to 14 carbon atoms, said secondary amine being liquid at room temperatures and soluble in said organic solvent;

(e) agitating said mixture; and
(f) recovering said penicillin after it forms and precipitates as a solid substantially free of any sulfonic acid contaminants.

7. The process of preparing α-aminobenzylpenicillin in pure form and high yield which comprises mixing
(a) water,
(b) a larger volume of a liquid, water-immiscible solvent,
(c) α-aminobenzylpenicillin beta-naphthalene sulfonate and
(d) a weight equal to at least one-half the weight of said α-aminobenzylpenicillin beta-naphthalene sulfonate of a secondary amine selected from the group consisting of the secondary amines having the formula

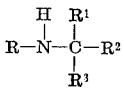

wherein R is an aliphatic group having from 10 to 14 carbon atoms and R¹, R² and R³ are each alkyl groups having a total of from 11 to 14 carbon atoms, said secondary amine being liquid at room temperatures and soluble in said organic solvent, (e) agitating said mixture; and
(f) recovering α-aminobenzylpenicillin after it forms and precipitates as a solid substantially free of beta-naphthalene sulfonic acid contaminants.

8. The process of preparing α-aminobenzylpenicillin in pure form and high yield which comprises mixing
(a) water,
(b) a larger volume of a liquid, water-immiscible solvent,
(c) a 1:1 molar adduct of α-aminobenzylpenicillin and an aminonaphthalene disulfonic acid and
(d) a weight equal to at least one-half the weight of said 1:1 molar adduct of α-aminobenzylpenicillin and an aminonaphthalene disulfonic acid of a secondary amine selected from the group consisting of the secondary amines having the formula

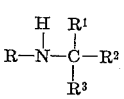

wherein R is an aliphatic group having from 10 to 14 carbon atoms and R¹, R² and R³ are each alkyl groups having a total of from 11 to 14 carbon atoms, said secondary amine being liquid at room temperatures and soluble in said organic solvent;

(e) agitating said mixture; and
(f) recovering α-aminobenzylpenicillin after it forms and precipitates as a solid substantially free of aminonaphthalene disulfonic acid contaminants.

9. The process of preparing an α-aminothienylmethylpenicillin in pure form and high yield which comprises mixing (a) water,
(b) a larger volume of a liquid, water-immiscible solvent,
(c) a 1:1 molar adduct of an α-aminothienylmethylpenicillin and an aminonaphthalene disulfonic acid and
(d) a weight equal to at least one-half the weight of said 1:1 molar adduct of an α-aminothienylmethylpenicillin and an aminonaphthalene disulfonic acid of a secondary amine selected from the group consisting of the secondary amines having the formula

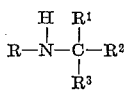

wherein R is an aliphatic group having from 10 to 14 carbon atoms and $R^1$, $R^2$ and $R^3$ are each alkyl groups having a total of from 11 to 14 carbon atoms, said secondary amine being liquid at room temperatures and soluble in said organic solvent;
(e) agitating said mixture; and
(f) recovering the α-aminothienylmethylpenicillin after it forms and precipitates as a solid substantially free of aminonaphthalene disulfonic acid contaminants.

10. The process of preparing in pure form and high yield the penicillin having the formula

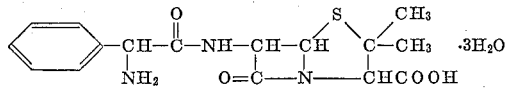

which comprises mixing below 60° C.
(a) water,
(b) a larger volume of a water-immiscible solvent,
(c) a penicillin sulfonate of the formula

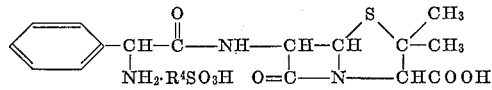

wherein $R^4$ is a member selected from the group consisting of

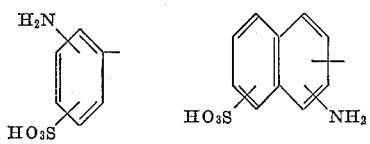

and

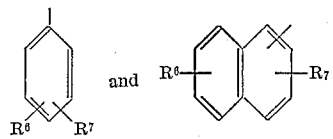

wherein $R^6$ and $R^7$ are each a member selected from the group consisting of hydrogen, alkyl containing from 1 to 12 carbon atoms (including straight and branched chain groups), (lower)alkoxy, (lower)alkylthio, nitro, (lower)alkanoylamino, (lower)alkanoyloxy, sulfamyl, chloro, iodo, bromo, fluoro, trifluoromethyl, (lower)alkylsulfonyl, carbo(lower)alkoxy, benzyl, phenethyl, cycloheptyl, cyclohexyl and cyclopentyl, and
(d) a weight equal to at least one-half the weight of said penicillin sulfonate of a secondary amine selected from the group consisting of the secondary amines having the formula

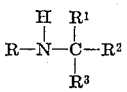

wherein R is an aliphatic group having from 10 to 14 carbon atoms and $R^1$, $R^2$ and $R^3$ are each alkyl groups having a total of from 11 to 14 carbon atoms, said secondary amine being liquid at room temperatures and soluble in said organic solvent;
(e) agitating said mixture; and
(f) recovering said penicillin trihydrate after it forms and precipitates as a solid substantially free of any sulfonic acid contaminants.

11. The process of preparing α-aminobenzylpenicillin trihydrate in pure form and high yield which comprises mixing below 60° C.
(a) water,
(b) a larger volume of a liquid, water-immiscible solvent,
(c) α-aminobenzylpenicillin beta-naphthalene sulfonate and
(d) a weight equal to at least one-half the weight of said α-aminobenzylpenicillin beta-naphthalene sulfonate of a secondary amine selected from the group consisting of the secondary amines having the formula

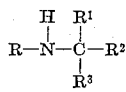

wherein R is an aliphatic group having from 10 to 14 carbon atoms and $R^1$, $R^2$ and $R^3$ are each alkyl groups having a total of from 11 to 14 carbon atoms, said secondary amine being liquid at room temperatures and soluble in said organic solvent,
(e) agitating said mixture; and
(f) recovering α-aminobenzylpenicillin trihydrate after it forms and precipitates as a solid substantially free of betanaphthalene sulfonic acid contaminants.

12. The process of preparing α-aminobenzylpenicillin trihydrate in pure form and high yield which comprises mixing below 60° C.
(a) water,
(b) a larger volume of methyl isobutyl ketone,
(c) α-aminobenzylpenicillin beta-naphthalene sulfonate and
(d) a weight equal to at least one-half the weight of said α-aminobenzylpenicillin beta-naphthalene sulfonate of a secondary amine selected from the group consisting of the secondary amines having the formula

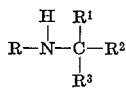

wherein R is an aliphatic group having from 10 to 14 carbon atoms and $R^1$, $R^2$ and $R^3$ are each alkyl groups having a total of from 11 to 14 carbon atoms, said secondary amine being liquid at room temperatures and soluble in said organic solvent,
(e) agitating said mixture; and
(f) recovering α-aminobenzylpenicillin trihydrate after it forms and precipitates as a solid substantially free of betanaphthalene sulfonic acid contaminants.

References Cited by the Examiner

UNITED STATES PATENTS

| | | | |
|---|---|---|---|
| 3,008,955 | 11/1961 | Johnson et al. | 260—239.1 |
| 3,008,956 | 11/1961 | Nettleton et al. | 260—239.1 |
| 3,157,640 | 11/1964 | Johnson et al. | 260—239.1 |
| 3,180,862 | 4/1965 | Silvestri et al. | 260—239.1 |

References Cited by the Applicant

UNITED STATES PATENTS

| | | |
|---|---|---|
| 2,985,648 | 5/1961 | Doyle et al. |

ALEX MAZEL, *Primary Examiner.*

JAMES W. ADAMS JR., *Assistant Examiner.*